US008160790B2

(12) United States Patent
Oshima et al.

(10) Patent No.: US 8,160,790 B2
(45) Date of Patent: Apr. 17, 2012

(54) VEHICLE SPEED CONTROL SYSTEM AND STRADDLE-TYPE VEHICLE

(75) Inventors: Takeru Oshima, Kobe (JP); Takuya Sakamoto, Akashi (JP); Satoru Sakanaka, Kobe (JP); Tatsuya Hirokami, Osaka (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 887 days.

(21) Appl. No.: 12/147,398

(22) Filed: Jun. 26, 2008

(65) Prior Publication Data

US 2009/0005943 A1 Jan. 1, 2009

(30) Foreign Application Priority Data

Jun. 29, 2007 (JP) ................................ 2007-172260

(51) Int. Cl.
*G06F 7/00* (2006.01)
*G06F 17/00* (2006.01)

(52) U.S. Cl. ................ 701/62; 701/69; 701/70; 701/85; 701/86

(58) Field of Classification Search .................... 701/62, 701/69, 70, 85, 86; 180/170, 178, 335; 123/349, 123/360, 361, 367, 376, 397, 398, 399, 406.52; 477/115, 206
See application file for complete search history.

(56) References Cited

U.S. PATENT DOCUMENTS

| | | | | |
|---|---|---|---|---|
| 4,879,657 | A * | 11/1989 | Tamura et al. | 701/110 |
| 5,124,922 | A * | 6/1992 | Akiyama | 701/85 |
| 5,253,172 | A * | 10/1993 | Ito et al. | 701/41 |
| 5,407,257 | A * | 4/1995 | Iwata | 303/122.09 |
| 5,429,428 | A * | 7/1995 | Yasuda | 303/139 |
| 5,822,709 | A * | 10/1998 | Fujita | 701/70 |
| 5,947,221 | A * | 9/1999 | Taniguchi et al. | 180/197 |
| 6,334,498 | B1 * | 1/2002 | Morisawa et al. | 180/65.25 |
| 6,647,959 | B2 * | 11/2003 | Noguchi | 123/396 |
| 6,907,860 | B2 * | 6/2005 | Mizobuchi et al. | 123/322 |
| 2003/0183194 | A1 * | 10/2003 | Noguchi | 123/396 |
| 2004/0250792 | A1 * | 12/2004 | Mizobuchi et al. | 123/322 |
| 2005/0267665 | A1 * | 12/2005 | Iwatsuki et al. | 701/70 |

FOREIGN PATENT DOCUMENTS

| | | |
|---|---|---|
| JP | 61-275539 | 12/1986 |
| JP | 04-121233 | 4/1992 |
| JP | 2003-065140 | 3/2003 |
| JP | 2005-054647 A | 3/2005 |
| JP | 2005-291173 A | 10/2005 |

* cited by examiner

*Primary Examiner* — Khoi Tran
*Assistant Examiner* — Jorge Peche
(74) *Attorney, Agent, or Firm* — Alleman Hall McCoy Russell & Tuttle LLP

(57) ABSTRACT

A vehicle speed control system for a vehicle including a failure detector configured to determine whether or not a failure occurs in the vehicle, a vehicle speed restriction controller configured to control a driving power source to decrease a vehicle speed of the vehicle when the failure detector detects the failure, and a driving state detector configured to detect a driving state of the vehicle. The vehicle speed restriction controller is configured to determine a deceleration pattern according to the driving state detected by the driving state detector at detection of the failure.

15 Claims, 11 Drawing Sheets

VEHICLE SPEED CONTROL SYSTEM AND STRADDLE-TYPE VEHICLE

TECHNICAL FIELD

The present invention relates to a vehicle speed control system configured to control a vehicle speed when a failure of a vehicle is detected, and a straddle-type vehicle.

BACKGROUND ART

Some conventional motorcycles include systems in which a grip position sensor detects an opening degree of a throttle grip gripped by a driver and an ECU (electronic control unit) electronically controls a motor, which in turn causes a throttle valve to be opened and closed, based on a detection value of the grip position sensor. In these systems, since an optimal target opening degree of the throttle valve is calculated and the opening degree of the throttle valve is electronically controlled so that a deviation between an actual opening degree and a target opening degree is minimized, an amount of intake-air supplied to the engine is maintained at an optimal level.

In some of the above described systems, when a failure occurs in its control system, the target opening degree is instantly set to an idling opening degree corresponding to an idling engine speed irrespective of an amount of the driver's grip operation, and the throttle valve is forcibly closed at a highest rotational speed of the motor. In the case of a four-wheeled vehicle whose vehicle body has a large weight, even if the throttle valve is quickly closed, the resulting deceleration shock is not great because of a larger inertia force. On the other hand, in the case of a lightweight vehicle whose vehicle body has a small weight, if the throttle valve is quickly closed, the resulting deceleration shock is great because of a smaller inertia force. In this case, the driver may sometime feel driving discomfort, depending on a driving state at the detection of a failure. Accordingly, to avoid the driver feeling driving discomfort, there has been disclosed a system in which a vehicle speed is gradually decreased by controlling the speed at which the throttle valve is closed, at the detection of a failure.

However, in the above described conventional system, the speed at which the throttle valve is closed is constant at the detection of a failure, irrespective of the driving state of the motorcycle. This may sometimes make the driver feel driving discomfort depending on the driving state at the detection of a failure. For example, when the motorcycle is being accelerated at the detection of a failure, the driver may feel a relatively large deceleration shock. On the other hand, when the motorcycle is being decelerated at the detection of a failure, the driver may feel a relatively small deceleration shock, because the time taken for completing the deceleration and reaching an idling state tends to be long. Such a situation occurs in vehicles other than motorcycles.

SUMMARY OF THE INVENTION

The present invention addresses the above described conditions, and an object of the present invention is to control deceleration of a vehicle according to a driving state of the vehicle when a failure is detected.

According to an aspect of the present invention, there is provided a vehicle speed control system for a vehicle comprising a failure detector configured to determine whether or not a failure occurs in the vehicle; a vehicle speed restriction controller configured to control a driving power source to decrease a vehicle speed of the vehicle when the failure detector detects the failure; and a driving state detector configured to detect a driving state of the vehicle; wherein the vehicle speed restriction controller is configured to determine a deceleration pattern according to the driving state detected by the driving state detector at the detection of the failure.

In such a configuration, since the vehicle speed restriction controller determines the deceleration pattern of the vehicle speed of the vehicle based on the driving state at the detection of the failure, deceleration control can be carried out correctly according to the driving state of the vehicle at the detection of the failure.

The vehicle speed control system may further comprise a command detector configured to detect a vehicle speed change command which is given by a driver; and a driving power output controller configured to change a driving power output of the driving power source in response to a signal output from the command detector. The failure detector may be configured to detect an abnormality in the command detector or in the driving power output controller as the failure.

In such a configuration, even when an abnormality occurs in the configuration in which the driving power output controller electronically controls the driving power output of the driving power source based on the signal output from the command detector, the electronic control can be transitioned to control for decreasing the vehicle speed.

The driving power source may be an engine. The command detector may be an operation position sensor configured to detect a position of an input member which is operated by the driver. The driving power output controller may include a throttle valve which controls an amount of intake-air supplied to the engine; an actuator configured to cause the throttle valve to change an opening degree; and an actuator controller configured to control the actuator based on a signal output from the operation position sensor. The vehicle speed restriction controller is configured to instruct the actuator controller to cause the throttle valve to decrease the opening degree to a target restricted opening degree, thereby decreasing the vehicle speed, when the failure detector detects the failure. As used herein, the target restricted opening degree may be a predetermined throttle opening degree or a throttle opening degree determined according to the driving state at or after the detection of the failure. For example, the restricted opening degree may be obtained by multiplying an amount of a throttle opening degree operation performed by the driver after the detection of the failure by a constant decrease rate, for example, 40%.

In such a configuration, the vehicle speed restriction controller is able to correctly control a speed at which the throttle valve is closed, according to the driving state at the detection of the failure. Thus, the vehicle speed of the vehicle can be effectively decreased.

The driving power source may be an engine. The command detector may be an operation position sensor configured to detect a position of an input member which is operated by the driver. The driving power output controller may include a throttle valve which controls an amount of intake-air supplied to the engine; an actuator including a motor configured to cause the throttle valve to change an opening degree; and an actuator controller configured to control the actuator based on a signal output from the operation position sensor. The throttle valve may be provided with a biasing mechanism configured to apply a force to cause the throttle valve to be moved to a restricted opening degree. The vehicle speed control system may further comprise a motor drive circuit connected to a pair of power feeding terminals of the actuator. The motor drive circuit may be switchable between a brake mode in which the pair of power feeding terminals are electrically connected and a free mode in which the pair of power feeding terminals are electrically disconnected from each other. The vehicle speed restriction controller may be configured to switch the motor drive circuit between the brake mode and the free mode to control a vehicle speed decrease rate, when the failure detector detects the failure.

In such a configuration, in the brake mode, since the pair of power feeding terminals is electrically connected, a braking force for inhibiting generation of an induced electromotive power between the power feeding terminals is applied to the motor when the motor is rotated by an external force. To be more specific, in the brake mode, the throttle valve is moved and closed slowly to the restricted opening degree by the force applied from the biasing mechanism without generating acceleration. On the other hand, in the free mode, the motor is freely rotated according to the external force, because the pair of power feeding terminals are electrically disconnected from each other. In other words, in the free mode, the throttle valve is moved and closed quickly to the restricted opening degree by the force applied from the biasing mechanism. Therefore, the vehicle speed restriction controller suitably switches the motor drive circuit between the brake mode and the free mode to control a resistance of the motor to the biasing mechanism and to thus control the speed at which the throttle valve is closed.

The vehicle speed restriction controller may be configured to instruct the actuator controller to cause the throttle valve to decrease the opening degree to a target restricted opening degree, thereby decreasing the vehicle speed, when the failure detector detects the failure in the command detector. The vehicle speed restriction controller may be configured to control the vehicle speed decrease rate of the vehicle in such a manner that the motor drive circuit is switched between the brake mode and the free mode, when the failure detector detects the failure in the driving power output controller.

In such a configuration, the deceleration control can be respectively correctly executed for the case of the failure of the actuator and for the case of the failure of components other than the actuator.

The vehicle speed control system may further comprise a throttle opening degree sensor configured to detect the opening degree of the throttle valve. The vehicle speed restriction controller may be configured not to execute deceleration control and the actuator controller may be configured to control the actuator based on the signal output from the operation position sensor, when the throttle opening degree corresponding to the signal output from the operation position sensor is smaller than the opening degree detected by the throttle opening degree sensor.

In such a configuration, the deceleration is carried out smoothly according to the driver's will rather than the control of the vehicle speed restriction controller, when the throttle opening degree corresponding to the signal output from the operation position sensor is smaller than the actual opening degree of the throttle valve.

The driving state detector may include a vehicle speed sensor which detects the vehicle speed of the vehicle. The vehicle speed restriction controller may be configured to determine the deceleration pattern such that a vehicle speed decrease rate decreases as the vehicle speed detected by the vehicle speed sensor at the detection of the failure by the failure detector increases.

In such a configuration, gradual deceleration is carried out when the vehicle speed at the detection of the failure is higher. This makes it possible to improve a driving feeling of the driver.

The driving state detector may include an acceleration sensor which detects a driving acceleration of the vehicle. The vehicle speed restriction controller may be configured to determine the deceleration pattern such that a vehicle speed decrease rate decreases as the driving acceleration detected by the acceleration sensor at the detection of the failure by the failure detector increases.

In such a configuration, since a gradual deceleration is carried out when the driving acceleration at the detection of the failure is higher, a deceleration shock felt by the driver can be reduced. On the other hand, quick deceleration may be performed when the driving acceleration at the detection of the failure is lower, which results not only in the deceleration shock felt by the driver being small, but also in the deceleration control being completed in a short time.

The driving state detector may include a gear position sensor configured to detect a gear position of a transmission in the vehicle. The vehicle speed restriction controller may be configured to determine the deceleration pattern such that a vehicle speed decrease rate decreases as the gear position detected by the gear position sensor at the detection of the failure by the failure detector decreases.

In such a configuration, when the gear position at the detection of the failure is lower, gradual deceleration is performed. Therefore, the deceleration shock felt by the driver can be reduced.

The driving state detector may include a vehicle speed sensor which detects the vehicle speed of the vehicle. The vehicle speed restriction controller may be configured to determine the deceleration pattern such that a vehicle speed decrease rate is smaller than a predetermined decrease rate when the vehicle speed detected by the vehicle speed sensor at the detection of the failure by the failure detector is higher than a preset value, and the vehicle speed decrease rate conforms to the predetermined decrease rate when the vehicle speed detected by the vehicle speed sensor at detection of the failure by the failure detector is not higher than the preset value.

In such a configuration, the deceleration can be performed correctly according to the vehicle speed at the detection of the failure.

The driving state detector may include an acceleration sensor which detects a driving acceleration of the vehicle. The vehicle speed restriction controller may be configured to determine the deceleration pattern such that a vehicle speed decrease rate is smaller than a predetermined decrease rate when the driving acceleration detected by the acceleration sensor at detection of the failure by the failure detector is higher than a preset value, and the vehicle speed decrease rate conforms to the predetermined decrease rate when the driving acceleration detected by the acceleration sensor at the detection of the failure by the failure detector is not higher than the preset value.

In such a configuration, the deceleration can be carried out correctly according to the driving acceleration at the detection of the failure.

The vehicle speed restriction controller may be configured to determine the deceleration pattern such that the vehicle speed changes as a linear function with respect to time when the driving state detector detects a first driving state of the vehicle, and changes as a function changing in a curve shape with respect to time when the driving state detector detects a second driving state of the vehicle.

In such a configuration, the deceleration can be carried out correctly according to the driving state at the detection of the failure.

The vehicle speed control system may further comprise a weight sensor configured to be able to detect a weight of a load carried on the vehicle. The vehicle speed restriction controller may be configured to determine the deceleration pattern such that a vehicle speed decrease rate increases as the weight of the load which is detected by the weight sensor increases.

In such a configuration, when the load carried on the vehicle is larger, an inertia force is larger and the deceleration shock is smaller. So, quick deceleration can be carried out with a higher vehicle speed decrease rate.

The driving power source may be an engine provided with an ignition device which ignites an air-fuel mixture in the engine. The vehicle speed restriction controller may be configured to retard an ignition timing of the ignition device to decrease the vehicle speed, when the failure detector detects the failure.

In accordance with the above configuration, since the vehicle speed restriction controller controls the ignition timing based on the driving state at the detection of the failure, the deceleration of the vehicle can be effectively carried out.

According to another aspect of the present invention, there is provided a straddle-type vehicle comprising a failure detector configured to determine whether or not a failure occurs in the vehicle; a vehicle speed restriction controller configured to control a driving power source to decrease a vehicle speed of the vehicle when the failure detector detects the failure; and a driving state detector configured to detect a driving state of the vehicle; wherein the vehicle speed restriction controller is configured to determine a deceleration pattern according to the driving state detected by the driving state detector at detection of the failure.

In such a configuration, since the straddle-type vehicle comprises the vehicle speed restriction controller configured to determine the deceleration pattern of the vehicle speed based on the driving state at the detection of the failure, the deceleration can be correctly carried out according to the driving state at the detection of the failure.

According to a further aspect of the present invention, there is provided a method of controlling a vehicle speed of a vehicle, comprising determining whether or not a failure occurs in the vehicle; detecting a driving state of the vehicle; determining a deceleration pattern based on the driving state detected at the detection of the failure; and decreasing a vehicle speed of the vehicle when the failure is detected.

In accordance with this method, the deceleration pattern of the vehicle speed is determined based on the driving state at the detection of the failure, and thus, the deceleration can be correctly carried out according to the driving state at the detection of the failure.

The above and further objects and features of the invention will more fully be apparent from the detailed description with accompanying drawings.

DETAILED DESCRIPTION OF THE PREFERRED EMBODIMENTS

Hereinafter, embodiments of the present invention will be described with reference to the accompanying drawings. Herein, directions are generally referenced from the perspective of a driver mounting a motorcycle.

Embodiment 1

Figure 1:
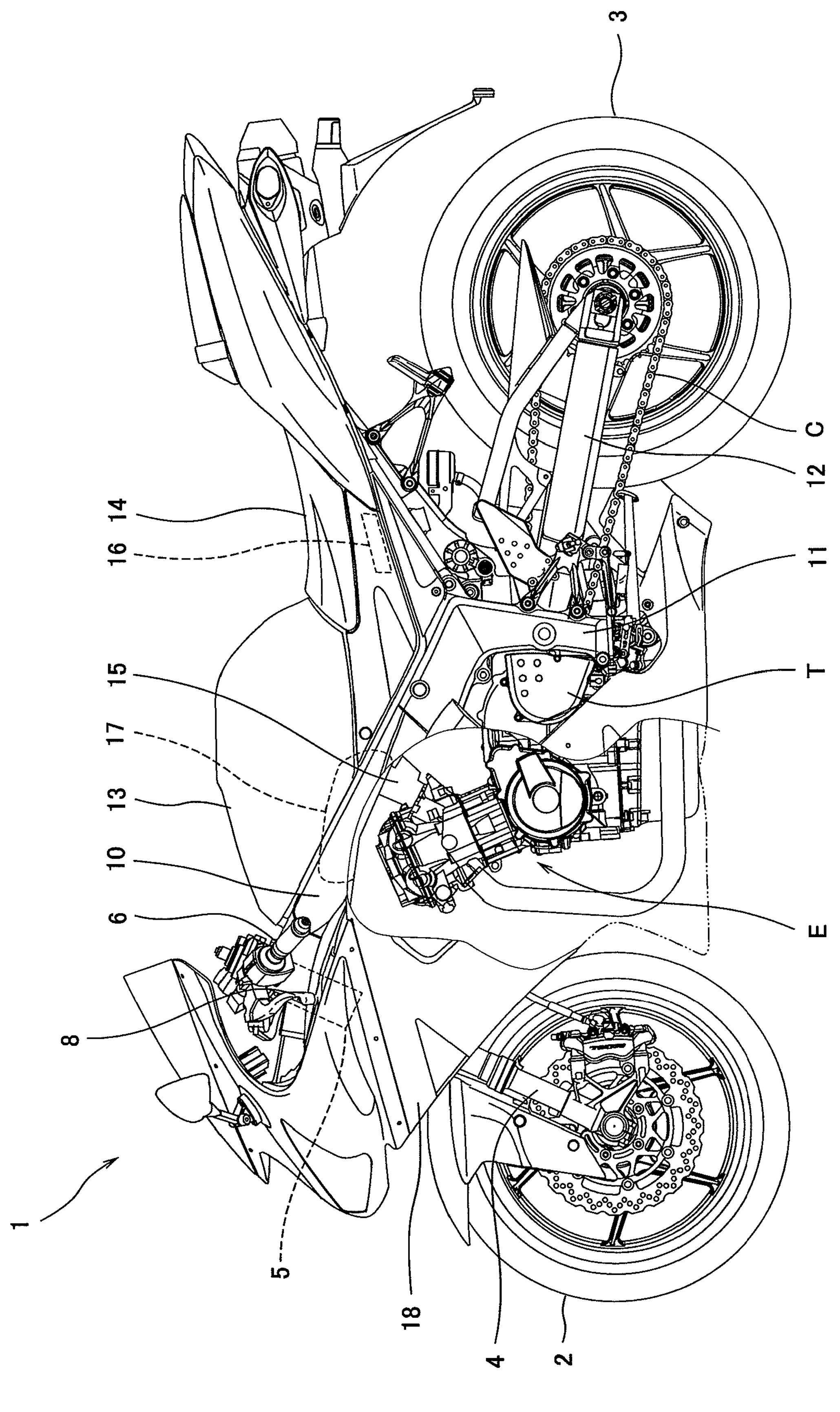
FIG. 1 is a left side view of a motorcycle according to a first embodiment of the present invention.
Figure 2:
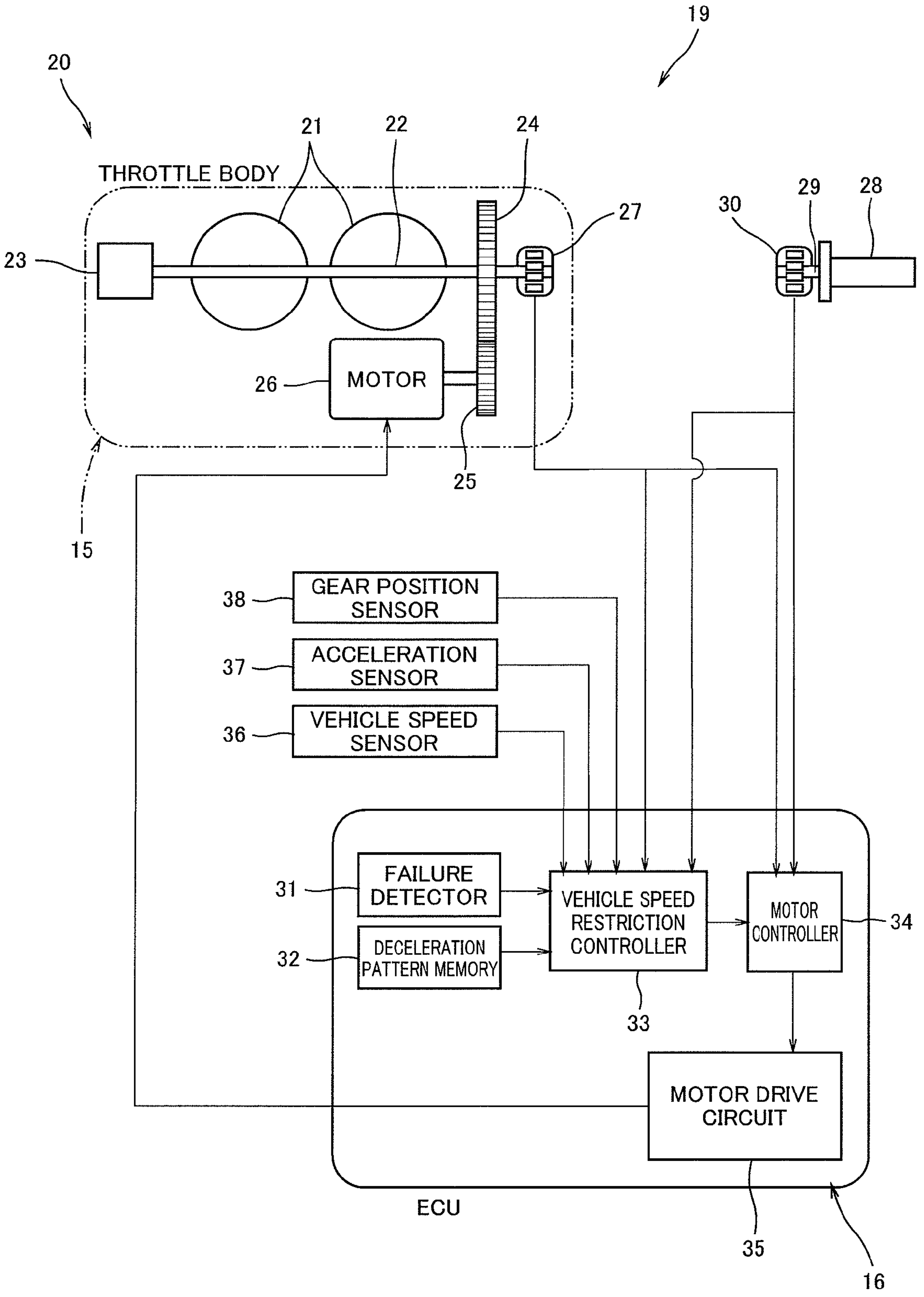
FIG. 2 is a block diagram showing a vehicle speed control system in the motorcycle of FIG. 2.

FIG. 1 is a left side view of a motorcycle 1 according to a first embodiment of the present invention. Turning now to FIG. 1, the motorcycle 1 is a straddle-type vehicle, including a front wheel 2 and a rear wheel 3. The front wheel 2 is rotatably mounted to a lower end portion of a front fork 4 extending substantially vertically. The front fork 4 is mounted on a steering shaft (not shown) by an upper bracket (not shown) attached to an upper end thereof, and an under bracket located below the upper bracket. The steering shaft is rotatably supported by a head pipe 5. A bar-type steering handle 6 extending rightward and leftward is attached to the upper bracket. A grip of the steering handle 6 which is gripped with a right hand of the driver is a throttle grip 28 (FIG. 2). The throttle grip 28 is an input member which is rotated by a force applied by a wrist of the driver to control a vehicle speed of the motorcycle 1. A clutch lever 8 is provided in front of a grip of the steering handle 6 which is gripped with a left hand of the driver. When the driver rotates the steering handle 6 clockwise or counterclockwise, the front wheel 2 is rotated to a desired direction around the steering shaft.

A pair of right and left main frames 10 extend rearward from the head pipe 5 to be slightly tilted in a downward direction. A pair of right and left pivot frames 11 are coupled to rear regions of the main frames 10. A swing arm 12 is pivotally mounted at a front end portion thereof to each pivot frame 11 and extends substantially in a longitudinal direction of the motorcycle 1. The rear wheel 3, which is a drive wheel, is rotatably mounted to a rear end portion of the swing arm 12. A fuel tank 13 is disposed behind the steering handle 6. A straddle-type seat 14, which is straddled by the driver, is disposed behind the fuel tank 13.

An engine (driving power source) E is mounted on the main frames 10 and the pivot frames 11 between the front wheel 2 and the rear wheel 3. A transmission T is coupled to the engine E. A driving power is output from the engine E to the transmission T and then to the rear wheel 3 via a chain C. A throttle body 15 is disposed on an inner side of the main frames 10 and is coupled to an intake port (not shown) of the engine E. An ECU (electronic control unit) 16 is accommodated in an inner space below the seat 14 and is configured to control the throttle body 15. An air cleaner box 17 is disposed below the fuel tank 13 and is coupled to an upstream portion of the throttle body 15 in the flow direction of intake-air. The air cleaner box 17 is configured to take in the air from outside by utilizing a running wind (ram pressure) from forward of the vehicle. A cowling 18 is mounted to extend from a front portion of the vehicle body to side portions of the vehicle body so as to cover the engine E and other components.

FIG. 2 is a block diagram of a vehicle speed control system 19 mounted in the motorcycle 1 of FIG. 1. As shown in FIG. 2, the vehicle speed control system 19 includes the known throttle body 15 provided therein with a butterfly-type throttle valve 21 which is configured to be opened and closed to control an amount of the intake-air supplied to the engine E (see FIG. 1). The throttle valve 21 is fixed to a throttle shaft 22 rotatably supported to the throttle body 15. A restricted opening degree biasing mechanism 23 described later is mounted on a left end portion of the throttle shaft 22.

A first gear 24 is mounted on the throttle shaft 22. The throttle body 15 has therein a motor (actuator) 26. A second gear 25 is mounted on a drive shaft of the motor 26 and is in mesh with the first gear 24. In this structure, a rotational driving force of the motor 26 is transmitted to the throttle shaft 22 via the first gear 24 and the second gear 25, causing the throttle valve 21 to be opened and closed. A throttle position sensor 27, which is a throttle opening degree sensor, is attached on a right end portion of the throttle shaft 22 and is configured to be able to detect a rotational angle (opening degree) of the throttle shaft 22. Instead of providing the throttle position sensor 27, the ECU 16 may serve as the throttle opening degree sensor in such a manner that the ECU 16 controls the number of rotations of the motor 26 and detects the rotational angle of the throttle shaft 22.

The throttle grip (input member) 28 is rotatable with a rotational shaft 29 rotatably mounted therein. A grip position sensor 30 is attached on the rotational shaft 29 to detect a rotational angle (opening degree) of the throttle grip 28. The grip position sensor 30 serves as a command detector for detecting a vehicle speed change command given by the driver to the throttle grip 28.

The ECU 16 includes a failure detector 31, a deceleration pattern memory 32, a vehicle speed restriction controller 33, a motor controller (actuator controller) 34, and a motor drive circuit 35. The failure detector 31 is configured to detect a failure occurring in a control system of the vehicle speed control system 19. The failure includes a failure of the motor 26 and failures of other components which impel the motor 26 to be stopped. For example, the failure detector 31 determines that a failure has occurred when a difference between a throttle opening degree corresponding to the signal output from the grip position sensor 30 and an actual opening degree detected by the throttle position sensor 27 continues to be larger than an allowable value for a specified time. In a case where two sensors having the same function are provided and it is checked whether or not the signals output from these sensors are equal, the failure detector 31 determines that the failure has occurred if a difference between the signals output from these sensors is outside an allowable range. In this case, the sensors may be a grip position sensor, a throttle position sensor, etc.

For example, there is a first failure state where the grip position sensor 30 is capable of correctly detecting a throttle opening degree command and malfunction of the motor 26 is less likely to occur. Also, there is a second failure state where the grip position sensor 30 is incapable of detecting the throttle opening degree command or the motor 26 needs to be stopped. In the first failure state, it may be estimated that the failure occurs in components other than the grip position sensor 30 and the motor 26. In the second failure state, it may be estimated that the failure occurs in the grip position sensor 30 or the motor 26.

The deceleration pattern memory 32 contains a plurality of deceleration patterns in which driving states of the motorcycle 1 such as a vehicle speed, a driving acceleration and a gear position are determined as parameters in the deceleration control at the detection of the failure. In the present embodiment, the deceleration pattern is a deceleration pattern of the throttle opening degree controlled by the motor 26.

Figure 3:
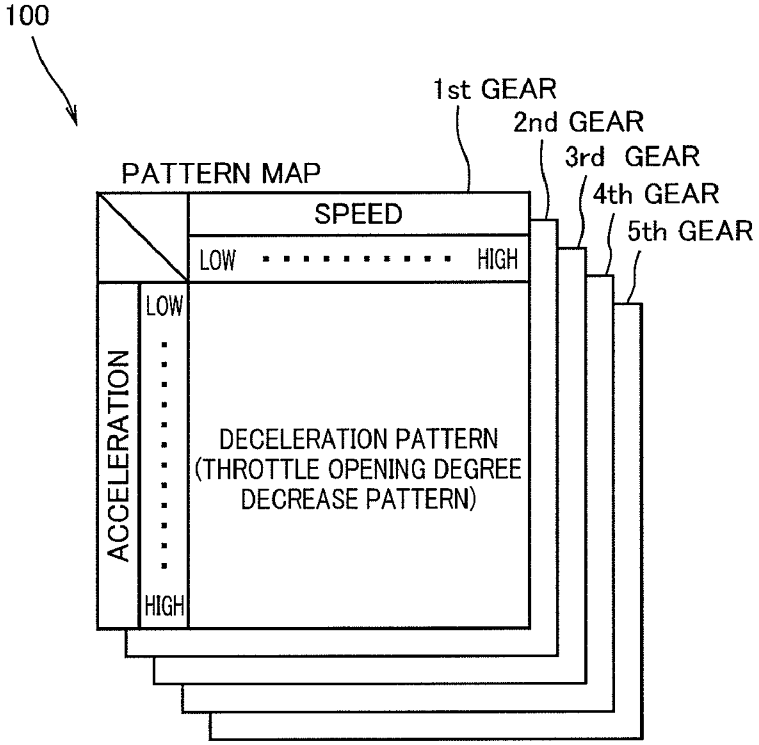
FIG. 3 is a view showing a pattern map stored in a deceleration pattern memory in the vehicle speed control system of FIG. 2.

FIG. 3 is a view showing a pattern map 100 stored in the deceleration pattern memory 32 in the vehicle speed control system 19 of FIG. 2. The pattern map 100 shown in FIG. 3 includes a number of deceleration patterns according to the values of the vehicle speed, the driving acceleration and the gear position. To be specific, the pattern map 100 may include a deceleration pattern (throttle opening degree decrease pattern) in which a vehicle speed decrease rate (throttle opening degree decrease rate) is smaller when the vehicle speed detected by the vehicle speed sensor 36 at the detection of the failure is higher, i.e., the vehicle speed decrease rate decreases as the vehicle speed at the detection of the failure increases.

In addition, the pattern map 100 may include a deceleration pattern (throttle opening degree decrease pattern) in which the vehicle speed decrease rate (throttle opening degree decrease rate) is smaller when the driving acceleration detected by an acceleration sensor 37 at the detection of the failure is higher, i.e., the vehicle speed decrease rate decreases as the driving acceleration increases. Furthermore, the pattern map 100 may include a deceleration pattern (throttle opening degree decrease pattern) in which the vehicle speed decrease rate (throttle opening degree decrease rate) is smaller when the gear position detected by the gear position sensor 38 at the detection of the failure is lower, i.e., the vehicle speed decrease rate decreases as the gear position decreases. For example, the vehicle speed decrease rate is smaller when the gear position detected by the gear position sensor 38 is a first gear than when the gear position is a second or higher gear position. As used herein, the term "vehicle speed decrease rate" refers to a decrease amount of the vehicle speed per unit time. The term "throttle opening degree decrease rate" refers to a closing amount of the throttle valve 21 per unit time. In the present embodiment, the vehicle speed control system 19 is configured to determine the vehicle speed decrease rate (throttle opening degree decrease rate) in at least an initial stage of the failure detection, based on the driving state of the vehicle.

Alternatively, the deceleration pattern 100 may include a deceleration pattern in which the vehicle speed decrease rate (throttle opening degree decrease rate) is smaller when a reduction gear ratio of the number of rotations of an output shaft of the transmission T with respect to the number of rotations of the crankshaft of the engine E is higher, i.e., the vehicle speed decrease rate decreases as the reduction gear ratio increases. In a further alternative, the deceleration pattern 100 may include a deceleration pattern in which the vehicle speed decrease rate (throttle opening degree decrease rate) is smaller when a driving acceleration command is given in a state where a reduction gear ratio of the number of rotations of the output shaft with respect to the engine speed is higher.

In a further alternative, the deceleration pattern 100 may include a deceleration pattern in which the vehicle speed decrease rate (throttle opening degree decrease rate) is larger when the acceleration sensor 36 detects that the motorcycle 1 is decelerated at the detection of the failure, than in a constant speed driving state or an accelerated driving state at the detection of the failure.

Moreover, driving states such as the vehicle speed or the driving acceleration may be detected using other driving state detectors such as the grip position sensor 30, the gear position sensor 38, and a brake sensor, and the vehicle speed decrease rate (throttle opening degree decrease rate) may be determined according to the detected driving state. For example, the deceleration pattern 100 may include a deceleration pattern in which the vehicle speed decrease rate (throttle opening degree decrease rate) is smaller when the grip position sensor 30 detects that the driving acceleration command is given at the determination of the failure, than in a case where a constant speed command is given at the determination of the failure. Or, the deceleration pattern 100 may include a deceleration pattern in which the vehicle speed decrease rate (throttle opening degree decrease rate) is larger when the brake sensor detects that a deceleration command has been given at the determination of the failure, than in a case where the constant speed command or the driving acceleration command is given at the determination of the failure.

Turning to FIG. 2 again, when the failure detector 31 detects the failure, the vehicle speed restriction controller 33 controls the motor 26 to gradually decrease the vehicle speed with reference to the deceleration pattern memory 32. At this time, the motor 26 decreases the opening degree of the throttle valve 21 at a rotational speed lower than its highest rotational speed. The motor controller 34 controls the motor 26 based on the signal output from the grip position sensor 30. The motor drive circuit 35 is a drive circuit to cause the motor 26 to perform forward rotation or reverse rotation. That is, the motor controller 34, the motor drive circuit 35 and the throttle body 15 serve as a driving power output controller 20 configured to change a driving power output of the engine E based on the signal output from the grip position sensor 30.

The vehicle speed sensor 36, the acceleration sensor 37, and the gear position sensor 38 are communicatively coupled to the vehicle speed restriction controller 33 of the ECU 16. The vehicle speed sensor 36 is configured to detect the vehicle speed in a driving direction of the motorcycle 1. The acceleration sensor 37 is configured to detect the driving acceleration in the driving direction of the motorcycle 1. The gear position sensor 38 is configured to detect the gear position of the transmission T of the motorcycle 1. That is, the vehicle speed sensor 36, the acceleration sensor 37, and the gear position sensor 38 serve as a driving state detector for detecting the driving states of the motorcycle 1. Alternatively, the driving acceleration may be detected by calculating a change amount per unit time of the value of the vehicle speed detected by the vehicle speed sensor 36.

Figure 4:
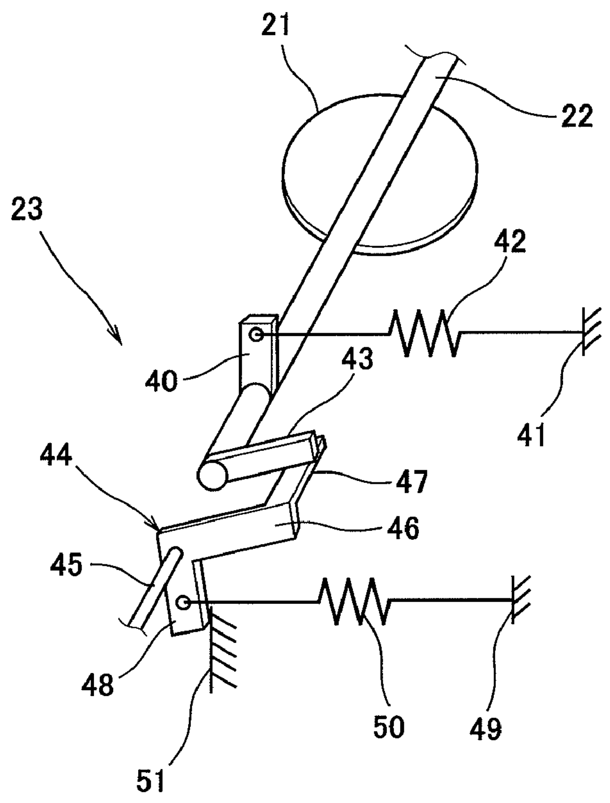
FIG. 4 is a schematic perspective view of a restricted opening degree biasing mechanism in the vehicle speed control system of FIG. 2.

FIG. 4 is a schematic perspective view of the restricted opening degree biasing mechanism 23 in the vehicle speed control system 19 of FIG. 2. As shown in FIG. 4, the restricted opening degree biasing mechanism 23 serves to maintain the throttle valve 21 at a restricted opening degree slightly larger than an idling opening degree corresponding to an idling engine speed, when the driving force of the motor 26 (FIG. 2) is not transmitted to the throttle shaft 22. To be specific, the restricted opening degree biasing mechanism 23 includes a first pivot member 40 and a second pivot member 43 which protrude from the throttle shaft 22 in directions perpendicular to a rotational axis of the rotational shaft 22. One end portion of a return spring 42 is coupled to the first pivot member 40 and an opposite end portion thereof is coupled to a fixed wall 41. That is, the throttle valve 21 is subjected to the force applied from return spring 42 in a direction to close the throttle valve 21.

A rotational shaft 45 is provided on an extended axis of the throttle shaft 22. A third pivot member 44 protrudes from the rotational shaft 45 in the direction perpendicular to a rotational axis of the rotational shaft 45. The third pivot member 44 is L-shaped in a side view. The third pivot member 44 has a first protruding portion 46 and a second protruding portion 48 between which a specified angle is formed in a side view. A support portion 47 protrudes from a tip end portion of the first protruding portion 46 to extend in the rotational axis direction of the throttle shaft 22. The support portion 47 supports the second pivot member 43 such that the support portion 47 is able to contact and move away from the second pivot member 43, and thereby correctly restricts a closing operation of the throttle valve 21. One end portion of an open spring 50 is coupled to the second protruding portion 48, and an opposite end portion thereof is coupled to the fixed wall 49. So, the open spring 50 applies a force in a direction to open the throttle valve 21. A stopper 51 is disposed on a movement track of the second protruding portion 48. The stopper 51 serves to restrict the operation of the support portion 47 to push up the second pivot member 43 within a predetermined angle range. In this structure, in the state where the driving force of the motor 26 (FIG. 2) is not transmitted to the throttle shaft 22, the return spring 42 and the open spring 50 cause the throttle valve 21 to be maintained at the restricted opening degree, which is slightly larger than the idling opening degree corresponding to the idling engine speed.

Figure 5:
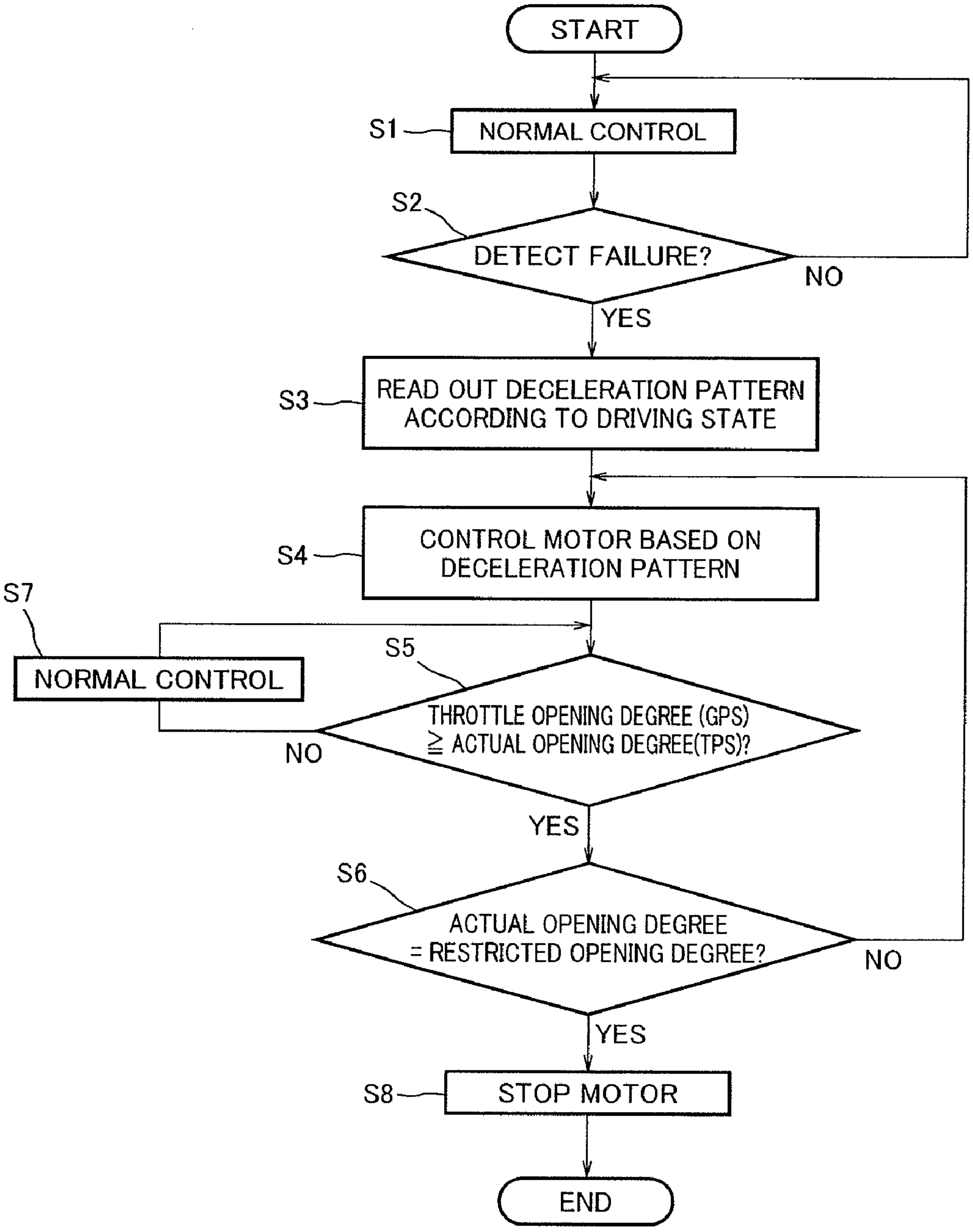
FIG. 5 is a flowchart showing deceleration control in the vehicle speed control system of FIG. 2.

Subsequently, the operation of the vehicle speed control system 19 will be described with reference to the configuration of FIG. 2 and the flowchart of FIG. 5. FIG. 5 is a flowchart showing deceleration control executed in the vehicle speed control system 19 of FIG. 2. When the power supply of the motorcycle 1 (FIG. 1) is turned on, the motor controller 34 of the ECU 16 controls the motor 26 based on the signal output from the grip position sensor 30 in a normal state (step S1). The ECU 16 determines whether or not the failure detector 31 detects a failure in the vehicle under the normal control (step S2). If it is determined that the failure detector 31 does not detect any failure (NO in step S2), the ECU 16 returns the process to step S1 and continues the normal control. On the other hand, if it is determined that the failure detector 31 detects a failure (YES in step S2), the vehicle speed restriction controller 33 reads out a deceleration pattern corresponding to the driving state of the motorcycle 1 at the detection of failure, from among the plurality of deceleration patterns stored in the deceleration pattern memory 32.

To be specific, the vehicle speed restriction controller 33 uses as parameters, the vehicle speed detected by the vehicle speed sensor 36 at the detection of the failure, the driving acceleration detected by the acceleration sensor 37 at the detection of the failure, and the gear position detected by the gear position sensor 38 at the detection of the failure, and selects the deceleration pattern corresponding to these parameters from those stored in the deceleration pattern memory 32. Then, the vehicle speed restriction controller 33 causes the motor controller 34 to drive the motor 26 based on the selected deceleration pattern, so that the opening degree of the throttle valve 21 is gradually decreased to a restricted opening degree $\alpha 2$ (FIG. 6) (step S4).

Figure 6:
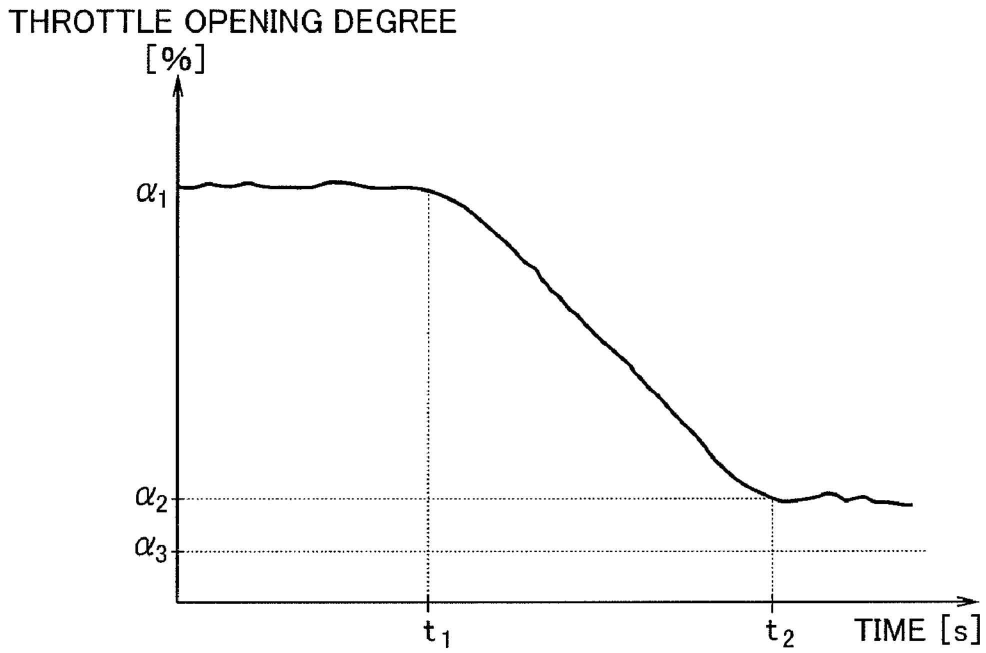
FIG. 6 is a graph showing a relationship between a throttle opening degree of a throttle valve and time which is associated with the deceleration control in the vehicle speed control system of FIG. 2.

FIG. 6 is a graph showing a relationship between the throttle opening degree of the throttle valve 21 and time which is associated with the deceleration control executed by the vehicle speed control system 19 of FIG. 2. As shown in FIG. 6, the throttle opening degree gradually decreases from an opening degree α1 at a time point t1 when the failure is detected and reaches the restricted opening degree α2 which is slightly larger than an idling opening degree α3 at a time point t2. From the time point t2, the throttle opening degree is kept substantially constant. In this case, time (t2−t1) taken for the throttle opening degree to change from α1 to α2, an opening degree decrease rate ((α2−α1)/(t2−t1)) with which the throttle opening degree changes from α1 to α2, and an opening degree decrease curve shape along which the throttle opening degree changes from α1 to α2, are varied for each deceleration pattern selected from those stored in the deceleration pattern memory 32. For example, the opening degree decrease curve shape may be a straight-line shape, a radial line shape, a step shape or combinations thereof.

Turning to FIG. 5 again, after step S4, the vehicle speed restriction controller 33 determines whether or not the throttle opening degree corresponding to the signal output from the grip position sensor 30 is not smaller than an actual opening degree which is detected by the throttle position sensor 27 (step S5). If it is determined that the throttle opening degree corresponding to the signal output from the grip position sensor 30 is smaller than the actual opening degree (NO in step S5), the ECU 16 returns to the normal control so that the throttle opening degree is decreased according to the driver's will (step S7). On the other hand, if it is determined that the throttle opening degree corresponding to the signal output from the grip position sensor 30 is not smaller than the actual opening degree (YES in step S5), the vehicle speed restriction controller 33 further determines whether or not the actual opening degree reaches the restricted opening degree (step S6).

If it is determined that the actual opening degree does not reach the restricted opening degree yet (NO in step S6), the ECU 16 returns the process to step S4 to continue the deceleration control. On the other hand, if it is detected that the actual opening degree has reached the restricted opening degree (YES in step S6), the vehicle speed restriction controller 33 stops the motor 26, and the restricted opening degree biasing mechanism 23 maintains the throttle opening degree at the restricted opening degree α2 (step S8). In the state where the motor 26 is stopped, the only way to increase the engine driving power is to put an ignition timing of the engine E ahead, and therefore the vehicle speed of the motorcycle 1 is restricted to be very low even if the driver operates the throttle grip 28 in the direction to open the throttle valve 21.

In accordance with the above configuration, since the vehicle speed restriction controller 33 determines the deceleration pattern based on the driving state at the detection of the failure, correct deceleration control can be carried out according to the driving state at the detection of the failure. In addition, the normal control is carried out when the throttle opening degree corresponding to the signal output from the grip opposition sensor 30 is smaller than the actual opening degree of the throttle valve 21, which is detected by the throttle position sensor 27. As a result, the deceleration can take place smoothly according to the driver's will.

According to the deceleration pattern map 100 stored in the deceleration pattern memory 32, the vehicle speed is decreased more gradually if the vehicle speed at the detection of the failure is higher. Therefore, driving feeling of the driver can be improved. If the driving acceleration at the detection of the failure is higher, the vehicle speed is decreased more gradually. This makes it possible to reduce a deceleration shock felt by the driver. On the other hand, if the driving acceleration at the detection of the failure is lower, the vehicle speed is decreased quickly because the deceleration shock felt by the driver is smaller, thereby completing the deceleration control in a short time. If the gear position is a first gear at the detection of the failure, the vehicle speed is decreased more gradually. Therefore, the deceleration shock felt by the driver can be reduced.

Whereas in the present embodiment, the deceleration patterns are predetermined with reference to the vehicle speed, the driving acceleration and the gear position as the driving states of the motorcycle 1, alternatively they may be determined with reference to the engine speed, the throttle opening degree, the failure state, and the like as the driving state. That is, the deceleration patterns may be determined with reference to a combination selected from the vehicle speed, the driving acceleration, the gear position, the engine speed, the throttle opening degree and the failure state, as the driving state of the motorcycle. Furthermore, whereas the failure detector 31 is provided within the ECU 16 in the vehicle speed control system 19, an external failure detecting means may send a failure signal to the ECU 16.

Moreover, whereas in the present embodiment, the restricted opening degree of the throttle valve 21 after the detection of the failure is set to the opening degree α2 which is slightly larger than the idling opening degree α3, the restricted opening degree may be set to the idling opening degree α3, or to a specified ratio (e.g., 40%) of the throttle opening degree corresponding to the signal output from the grip position sensor 30.

Embodiment 2

Figure 7:
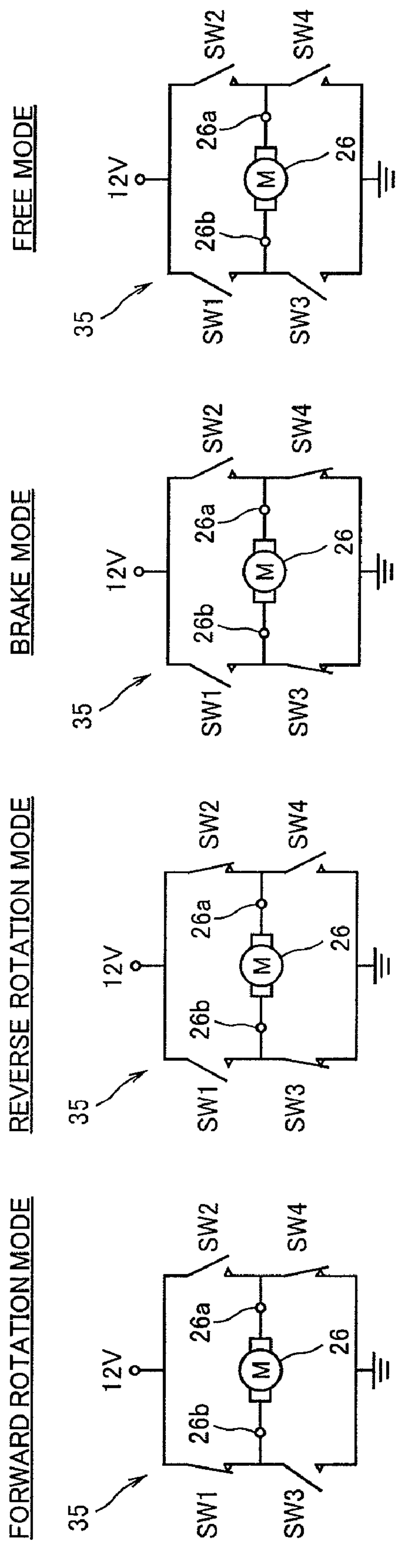
FIG. 7 is a circuit diagram showing modes of a motor drive circuit in an ECU in a vehicle speed control system according to a second embodiment of the present invention.

FIG. 7 is a circuit diagram showing modes of the motor drive circuit 35 in an ECU of a vehicle speed control system according to a second embodiment of the present invention. In the description below, the same or corresponding components as those in the first embodiment will not be further described. As shown in FIG. 7, the motor dive circuit 35 is an H-bridge circuit. The H-bridge circuit 35 is connected to a pair of power feeding terminals 26*a* and 26*b*. The H-bridge circuit 35 includes a pair of high side switches SW1 and SW2 constituted by transistors and a pair of low side switches SW3 and SW4 constituted by the transistors.

The H-bridge circuit 35 has a forward rotation mode, a reverse rotation mode, a brake mode, and a free mode. In the forward rotation mode, the left high side switch SW1 and the right low side switch SW4 are in on-states, and the right high side switch SW2 and the left low side switch SW3 are in off-states. In the forward rotation mode, the motor 26 is driven to rotate so as to increase the throttle opening degree of the throttle valve 21. On the other hand, in the reverse rotation mode, the left high side switch SW1 and the right low side switch SW4 are in off-states, and the right high side switch SW2 and the left low side switch SW3 are in on-states. In the reverse rotation mode, the motor 26 is driven to rotate so as to decrease the throttle opening degree of the throttle valve 21.

In the brake mode, the pair of high side switches SW1 and SW2 are in off-states and the pair of low side switches SW3 and SW4 are in on-states. In the brake mode, the pair of power feeding terminals 26*a* and 26*b* of the motor 26 are electrically connected. Therefore, in a case where the motor 26 is rotated by an external force applied from the restricted opening degree biasing mechanism 23 in the brake mode, a braking force for inhibiting generation of an induced electromotive force between the power feeding terminals 26*a* and 26*b* is applied to the motor 26, which is thereby maintained in a slow rotational state in which no acceleration occurs.

In the free mode, the high side switches SW1 and SW2 are in off-states and the low side switches SW3 and SW4 are in off-states. In the free mode, the pair of power feeding terminals 26*a* and 26*b* of the motor 26 are electrically disconnected from each other. Therefore, in a case where the motor 26 is rotated by the external force applied from the restricted opening degree biasing mechanism 23 in the free mode, the motor 26 is rotatable freely and quickly according to the external force.

Figure 8:
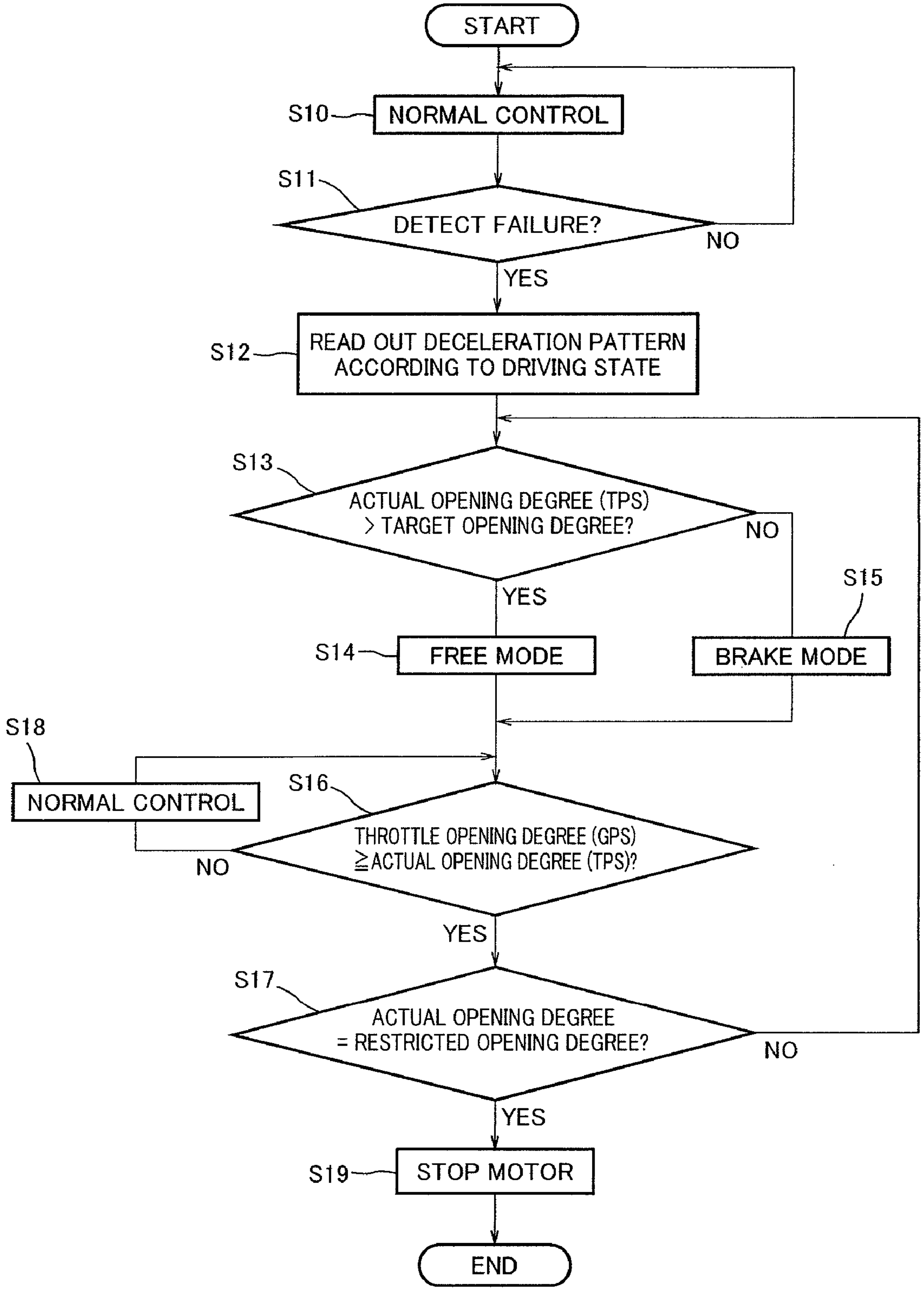
FIG. 8 is a flowchart showing deceleration control in the vehicle speed control system according to the second embodiment.

FIG. 8 is a flowchart showing deceleration control in the vehicle speed control system of the second embodiment. Steps S10 to S12 in FIG. 8 are identical to the steps S1 to S3 of the first embodiment, and will not be further described. After the step S12, it is determined whether or not an actual opening degree detected by the throttle position sensor 27 is larger than a current target opening degree determined by a deceleration pattern read out from the deceleration pattern memory 32 (step S13).

If it is determined that the actual opening degree is larger than the target opening degree (YES in step S13), the H-bridge circuit 35 is controlled to turn to the free mode so that the throttle opening degree is quickly decreased (step S14). On the other hand, if it is determined that the actual opening degree is not larger than the target opening degree (NO in step S13), the H-bridge circuit 35 is controlled to turn to the brake mode so that the throttle opening degree is decreased gradually (step S15).

Steps S16 to S18 are identical to the steps S5 to S7 in the first embodiment, and will not be further described. If it is determined that the actual opening degree does not reach the restricted opening degree yet (NO in step S17), the ECU 16 returns the process to step S13 to continue the deceleration control. On the other hand, if it is determined that the actual opening degree has reached the restricted opening degree (YES in step S17), the H-bridge circuit 35 is turned to the brake mode to stop the motor 26, and under this condition, the restricted opening degree biasing mechanism 23 maintains the throttle opening degree of the throttle valve 21 at the restricted opening degree α2 (step S19).

Figure 9:
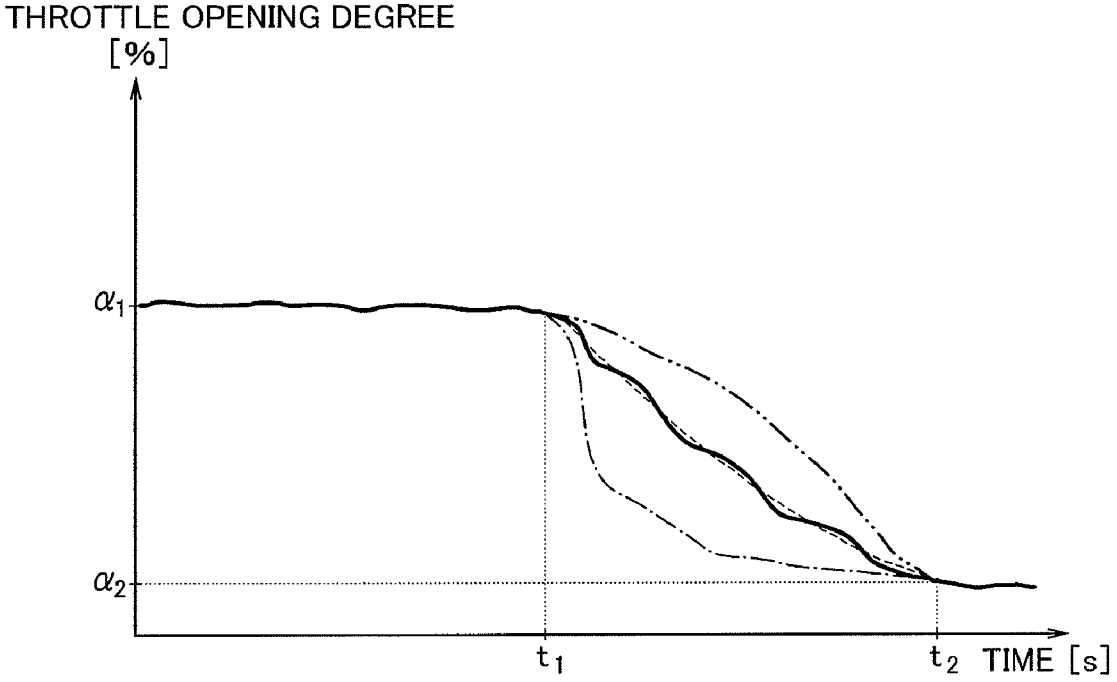
FIG. 9 is a graph showing a relationship between a throttle opening degree of the throttle valve and time which is associated with the deceleration control in the vehicle speed control system according to the second embodiment.

FIG. 9 is a graph showing a relationship between a throttle opening degree of the throttle valve 21 and time which is associated with the deceleration control in the vehicle speed control system according to the second embodiment. In FIG. 9, one-dotted line indicates that the throttle opening degree is decreased using only the free mode, two-dotted line indicates that the throttle opening degree is decreased only using the brake mode, a broken line indicates a target opening degree of a deceleration pattern (throttle opening degree decrease pattern) of the present invention, and a solid line indicates an actual opening degree controlled based on the deceleration pattern (throttle opening degree decrease pattern) of the present invention. As shown in FIG. 9, the H-bridge circuit 35 is suitably switched between the brake mode and the free mode from a time point t1 at the detection of the failure so that the throttle opening degree conforms to the target opening degree, and is gradually decreased from α1 substantially according to the target opening degree. From a time point t2 when the throttle opening degree has reached the restricted opening degree α2, the throttle opening degree is kept substantially constant.

In accordance with the above described configuration of the second embodiment, since the H-bridge circuit 35 is suitably switched between the brake mode and the free mode, resistance of the motor 26 with respect to the restricted opening degree biasing mechanism 23 can be controlled, making it possible to control a decrease rate of the throttle opening degree.

Embodiment 3

Figure 10:
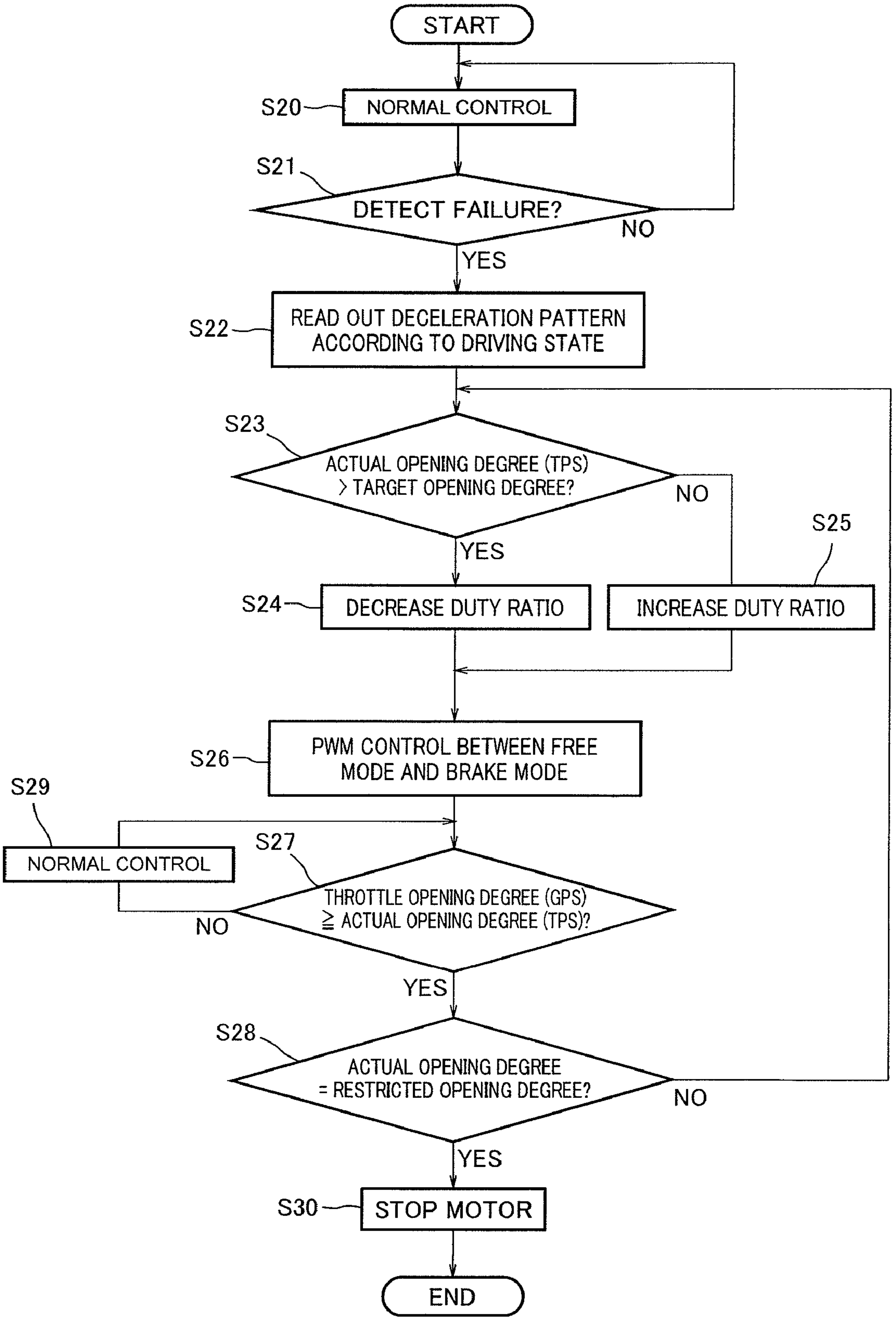
FIG. 10 is a flowchart showing deceleration control in a vehicle speed control system according to a third embodiment.
Figure 11:
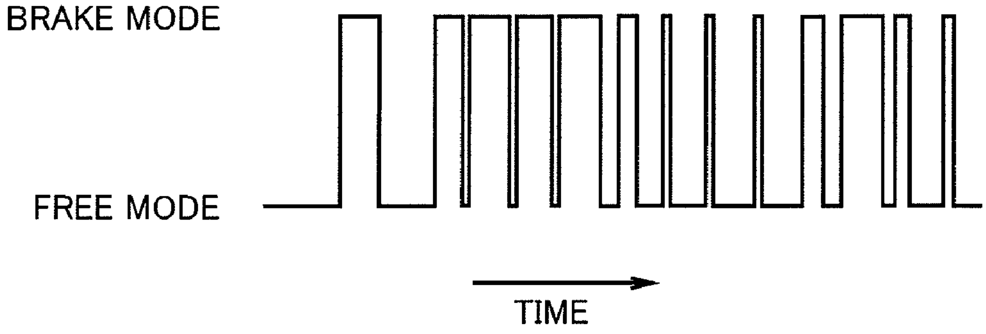
FIG. 11 is a view showing PWM control in the vehicle speed control system according to the third embodiment.

FIG. 10 is a flowchart showing deceleration control in a vehicle speed control system according to a third embodiment. FIG. 11 is a view showing PWM control in the vehicle speed control system according to the third embodiment. As in the second embodiment, the motor drive circuit 35 in the third embodiment is the H-bridge circuit. In the third embodiment, the H-bridge circuit 35 is switched between the brake mode and the free mode under the PWM control. A duty ratio in the PWM control indicates a ratio of time for which the low side switches SW3 and SW4 of the H-bridge circuit 35 are turned on simultaneously. In the description below, the same or corresponding components as those in the first and second embodiments will not be further described.

Steps S20 to S23 in FIG. 10 are identical to the steps S10 to S13 of the second embodiment, and will not be further described. If it is determined that the actual opening degree is larger than the target opening degree (YES in step S23), the duty ratio is decreased a predetermined amount, and thereby the throttle opening degree is quickly decreased (step S24). On the other hand, if it is determined that the actual opening degree is not larger than the target opening degree (NO in step S23), the duty ratio is increased a predetermined amount, and thereby the throttle opening degree is gradually decreased (step S25). Then, as shown in FIG. 11, the PWM control is executed between the brake mode and the free mode based on the duty ratio (step S26). Steps S27 to S30 are identical to the steps S16 to S19 in the second embodiment, and will not be further described.

In accordance with the above described configuration, the H-bridge circuit 35 is suitably switched between the brake mode and the free mode from the time point when the failure is detected so that the throttle opening degree conforms to the target opening degree. Thus, the throttle opening degree is gradually decreased so as to conform to the target opening degree. In other words, by switching the H-bridge circuit 35 between the brake mode and the free mode, resistance of the motor 26 with respect to the restricted opening degree biasing mechanism 23 is controlled, making it possible to control the decrease rate of the throttle opening degree.

In accordance with the second embodiment or the third embodiment, even when a failure such as a signal output failure in the grip position sensor 30, a signal output failure in the throttle opening degree in the motor drive circuit 35, or a throttle valve driving failure in the motor 26, occurs, the decrease rate of the throttle opening degree can be controlled if the signal output from the throttle position sensor 27 and controllability of the H-bridge circuit are correct.

The above described embodiments may be combined suitably. For example, the failure detector 31 may determine whether or not the first failure state or the second failure state has occurred. If the failure detector 31 determines that the second failure state has occurred, the operation in the second embodiment or the third embodiment may be performed, whereas when the failure detector 31 determines that the first failure has occurred, the operation in the first embodiment may be performed. This makes it possible to reliably perform the deceleration operation based on the failure state.

If the vehicle speed or the driving acceleration at the detection of the failure is higher than a preset value, a deceleration pattern in which a vehicle speed decrease rate is smaller than a predetermined decrease rate may be used, whereas if the vehicle speed or the driving acceleration at the detection of the failure is not higher than the preset value, a deceleration pattern in which a vehicle speed decrease rate conforms to the predetermined decrease rate may be used. This makes it possible to reduce a deceleration shock felt by the driver and to transition to the driving state in the failure state as soon as possible. Thus, the deceleration pattern may be varied between the case where the vehicle speed or the driving acceleration is higher than the preset value and the case where the vehicle speed or the driving acceleration is lower than the preset value while the vehicle is decreased at the detection of the failure.

In addition to the vehicle speed decrease state, a transient change of the vehicle speed with respect to time may be changed according to a driving state. For example, the deceleration pattern may be such that in a first driving state in which the deceleration shock felt by the driver at the detection of the failure is small, the vehicle speed changes as a linear function with respect to the time, whereas in a second driving state in which the deceleration shock felt by the driver at the detection of the failure is large, the vehicle speed changes as a function changing in a curve shape or in a multi-step shape with respect to the time. In the first driving state, the vehicle speed and the driving acceleration are lower than predetermined values, while in the second driving state, the vehicle speed and the driving acceleration are higher than the predetermined values. It is desirable that in the second driving state, at least a vehicle speed decrease rate in an initial stage of the detection of the failure be smaller than in the first driving state. Furthermore, the deceleration pattern may be such that the vehicle speed decrease rate is larger in a case where a load carried on the vehicle measured by a weight sensor attached to the vehicle has a heavy weight than in a case where a load measured by the weight sensor has a light weight, i.e., the vehicle speed decrease rate increases as the load increases.

Whereas in the present embodiment, the throttle opening degree is controlled to decrease the vehicle speed at the detection of the failure, other methods may be employed to decrease the engine driving power. For example, the ignition timing may be controlled to be retarded to decrease the engine driving power, and the vehicle speed may be decreased according to a desired deceleration pattern. The driving power source may be a driving power generating system including an electric motor, other than the driving power generating system including the engine. The command detector may be a vehicle speed command switch, instead of the grip position sensor.

The vehicle speed control system of he present invention is suitably applicable to vehicles, such as motorcycles, personal watercraft (PWC) or straddle-type all terrain vehicles.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle speed control system for a vehicle comprising:

a failure detector configured to determine whether or not a failure occurs in the vehicle;

a vehicle speed restriction controller configured to control an engine to decrease a vehicle speed of the vehicle when the failure detector detects the failure;

a driving state detector configured to detect a driving state of the vehicle;

an operation position sensor configured to detect a position of an input member which is operated by a driver;

a driving power output controller including a throttle valve which controls an amount of intake-air supplied to the engine, an actuator configured to cause the throttle valve to change an opening degree, and an actuator controller configured to control the actuator based on a signal output from the operation position sensor; and a throttle opening degree sensor configured to detect the actual opening degree of the throttle valve;

wherein the vehicle speed restriction controller is configured to determine a deceleration pattern according to the driving state detected by the driving state detector at detection of the failure;

wherein the vehicle speed restriction controller is configured to instruct the actuator controller to cause the throttle valve to decrease the opening degree to a target restriction opening degree if it is determined that the opening degree corresponding to the signal output from the operation position sensor is not smaller than the actual opening degree detected by the throttle opening degree sensor, thereby decreasing the vehicle speed, when the failure detector detects the failure; and wherein the vehicle speed restriction controller is configured not to execute deceleration control and the actuator controller is configured to control the actuator based on the signal output from the operation position sensor, when the throttle opening degree corresponding to the signal output from the operation position sensor is smaller than the opening degree detected by the throttle opening degree sensor.

2. The vehicle speed control system according to claim 1, wherein the throttle valve is provided with a biasing mechanism configured to apply a force to cause the throttle valve to be moved to a restricted position;

the system further comprising:

a motor drive circuit connected to a pair of power feeding terminals of the actuator;

wherein the motor drive circuit is switchable between a brake mode in which the pair of power feeding terminals are electrically connected and a free mode in which the pair of power feeding terminals are electrically disconnected from each other; and wherein the vehicle speed restriction controller is configured to switch the motor drive circuit between the brake mode and the free mode to control a vehicle speed decrease rate, when the failure detector detects the failure.

3. The vehicle speed control system according to claim 2, wherein the vehicle speed restriction controller is configured to control the vehicle speed decrease rate in such a manner that the motor drive circuit is switched between the brake mode and the free mode, when the failure detector detects the failure in the driving power output controller.

4. The vehicle speed control system according to claim 1, wherein the driving state detector includes a vehicle speed sensor which detects the vehicle speed of the vehicle; and wherein the vehicle speed restriction controller is configured to determine the deceleration pattern such that a vehicle speed decrease rate decreases as the vehicle speed detected by the vehicle speed sensor at detection of the failure by the failure detector increases.

5. The vehicle speed control system according to claim 1, wherein the driving state detector includes an acceleration sensor which detects a driving acceleration of the vehicle; and wherein the vehicle speed restriction controller is configured to determine the deceleration pattern such that a vehicle speed decrease rate decreases as the driving acceleration detected by the acceleration sensor at detection of the failure by the failure detector increases.

6. The vehicle speed control system according to claim 1, wherein the driving state detector includes a gear position sensor configured to detect a gear position of a transmission in the vehicle; and wherein the vehicle speed restriction controller is configured to determine the deceleration pattern such that a vehicle speed decrease rate decreases as the gear position detected by the gear position sensor at detection of the failure decreases.

7. The vehicle speed control system according to claim 1, wherein the driving state detector includes a vehicle speed sensor which detects the vehicle speed of the vehicle; and wherein the vehicle speed restriction controller is configured to determine the deceleration pattern such that a vehicle speed decrease rate is smaller than a predetermined decrease rate when the vehicle speed detected by the vehicle speed sensor at detection of the failure by the failure detector is higher than a preset value, and the vehicle speed decrease rate conforms to the predetermined decrease rate when the vehicle speed detected by the vehicle speed sensor at detection of the failure by the failure detector is not higher than the preset value.

8. The vehicle speed control system according to claim 1, wherein the driving state detector includes an acceleration sensor which detects a driving acceleration of the vehicle; and wherein the vehicle speed restriction controller is configured to determine the deceleration pattern such that a vehicle speed decrease rate is smaller than a predetermined decrease rate when the driving acceleration detected by the acceleration sensor at detection of the failure by the failure detector is higher than a preset value, and the vehicle speed decrease rate conforms to the predetermined decrease rate when the driving acceleration detected by the acceleration sensor at detection of the failure by the failure detector is not higher than the preset value.

9. The vehicle speed control system according to claim 1, wherein the vehicle speed restriction controller is configured to determine the deceleration pattern such that the vehicle speed changes as a linear function with respect to time when the driving state detector detects a first driving state of the vehicle, and changes as a function changing in a curve shape with respect to time when the driving state detector detects a second driving state of the vehicle.

10. The vehicle speed control system according to claim 1, further comprising:

a weight sensor configured to be able to detect a weight of a load carried on the vehicle;

wherein the vehicle speed restriction controller is configured to determine the deceleration pattern such that a vehicle speed decrease rate increases as the weight of the load which is detected by the weight sensor increases.

11. The vehicle speed control system according to claim 1, wherein the engine is provided with an ignition device which ignites an air-fuel mixture in the engine;

wherein the vehicle speed restriction controller is configured to retard an ignition timing of the ignition device to decrease the vehicle speed, when the failure detector detects the failure.

12. A straddle-type vehicle comprising:

a failure detector configured to determine whether or not a failure occurs in the vehicle;

a vehicle speed restriction controller configured to control an engine to decrease a vehicle speed of the vehicle when the failure detector detects the failure;

a driving state detector configured to detect a driving state of the vehicle;

an operation position sensor configured to detect a position of an input member which is operated by a driver;

a driving power output controller including a throttle valve which controls an amount of intake-air supplied to the engine, an actuator configured to cause the throttle valve to change an opening degree, and an actuator controller configured to control the actuator based on a signal output from the operation position sensor; and a throttle opening degree sensor configured to detect the actual opening degree of the throttle valve;

wherein the vehicle speed restriction controller is configured to determine a deceleration pattern according to the driving state detected by the driving state detector at detection of the failure;

wherein the vehicle speed restriction controller is configured to instruct the actuator controller to cause the throttle valve to decrease the opening degree to a target restriction opening degree if it is determined that the opening degree corresponding to the signal output from the operation position sensor is not smaller than the actual opening degree detected by the throttle opening degree sensor, thereby decreasing the vehicle speed, when the failure detector detects the failure; and wherein the vehicle speed restriction controller is configured not to execute deceleration control and the actuator controller is configured to control the actuator based on the signal output from the operation position sensor, when the throttle opening degree corresponding to the signal output from the operation position sensor is smaller than the opening degree detected by the throttle opening degree sensor.

13. A method of controlling a vehicle speed of a vehicle, comprising:

determining whether or not a failure occurs in the vehicle, via a failure detector;

controlling an engine to decrease a vehicle speed of the vehicle via a vehicle speed restriction controller when the failure is detected;

detecting a driving state of the vehicle;

detecting a position of an input member which is operated by a driver, via an operation position sensor;

detecting an actual opening degree of a throttle valve that controls an amount of intake-air supplied to the engine, via a throttle opening degree sensor;

controlling an actuator for the throttle valve via an actuator controller based on a signal output from the operation position sensor; and determining a deceleration pattern based on the driving state detected at detection of the failure;

wherein the vehicle speed restriction controller is configured to instruct the actuator controller to cause the throttle valve to decrease the opening degree to a target restriction opening degree if it is determined that the opening degree corresponding to the signal output from the operation position sensor is not smaller than the actual opening degree detected by the throttle opening degree sensor, thereby decreasing the vehicle speed, when the failure detector detects the failure; and wherein the vehicle speed restriction controller is configured not to execute deceleration control and the actuator controller is configured to control the actuator based on the signal output from the operation position sensor, when the throttle opening degree corresponding to the signal output from the operation position sensor is smaller than the opening degree detected by the throttle opening degree sensor.

14. A vehicle speed control system for a vehicle comprising:

a command detector configured to detect a vehicle speed change command which is given by a driver;

a failure detector configured to determine whether or not a failure occurs in the vehicle;

a vehicle speed restriction controller configured to control an engine to decrease a vehicle speed of the vehicle regardless of whether or not the vehicle speed change command is a vehicle speed restriction command or when the failure detector detects failure;

a driving state detector configured to detect a driving state of the vehicle;

an operation position sensor configured to detect a position of an input member which is operated by the driver;

a driving power output controller includes a throttle valve which controls an amount of intake-air supplied to the engine, an actuator configured to cause the throttle valve to change an opening degree, and an actuator controller configured to control the actuator based on a signal output from the operation position sensor; and a throttle opening degree sensor configured to detect the actual opening degree of the throttle valve;

wherein the vehicle speed restriction controller is configured to determine a deceleration pattern according to the driving state detected by the driving state detector at detection of the failure;

wherein the vehicle speed restriction controller is configured to instruct the actuator controller to cause the throttle valve to decrease the opening degree to a target restriction opening degree if it is determined that the opening degree corresponding to the signal output from the operation position sensor is not smaller than the actual opening degree detected by the throttle opening degree sensor, thereby decreasing the vehicle speed, when the failure detector detects the failure; and wherein the vehicle speed restriction controller is configured not to execute deceleration control and the actuator controller is configured to control the actuator based on the signal output from the operation position sensor, when the throttle opening degree corresponding to the signal output from the operation position sensor is smaller than the opening degree detected by the throttle opening degree sensor.

15. The vehicle speed control system according to claim 14, where the deceleration pattern is a decreasing pattern of the opening degree of the throttle valve.

* * * * *